Jan. 21, 1947.  R. A. BERG  2,414,436
TEMPERATURE COMPENSATING CONDENSER FOR ELECTRICAL CIRCUITS
Filed March 25, 1943
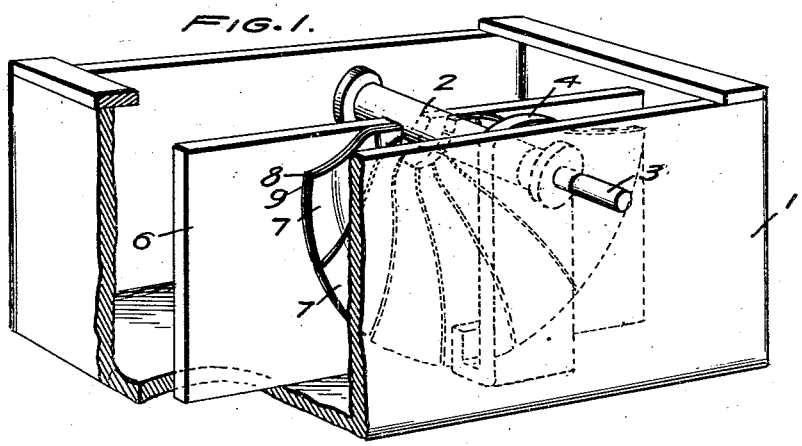
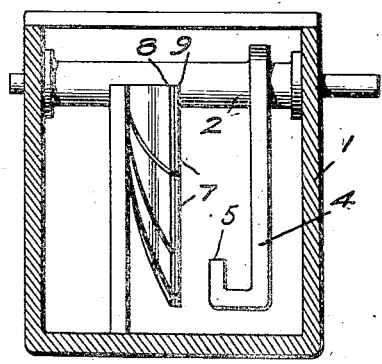
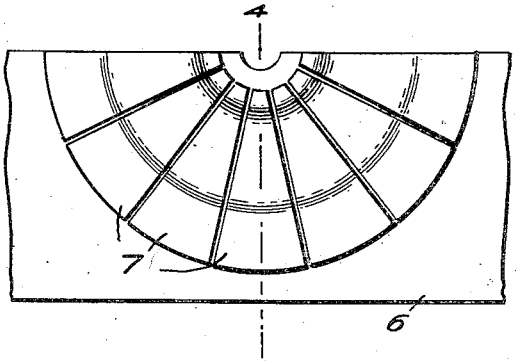
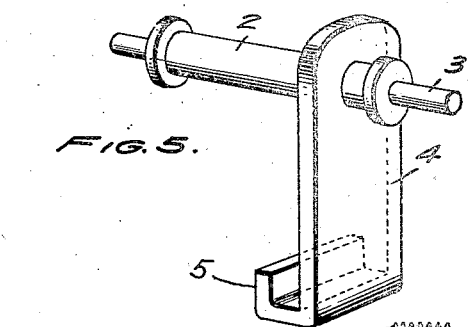
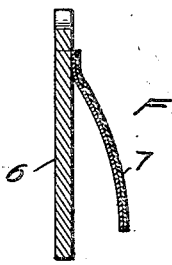
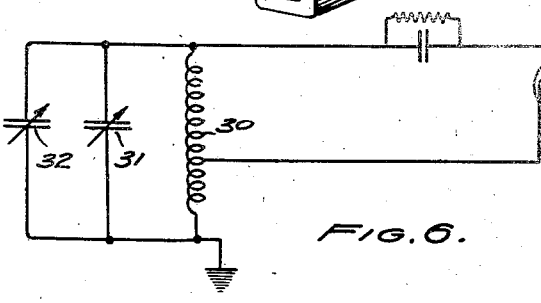
INVENTOR
RUSSELL A. BERG
BY
William D. Hall.
ATTORNEY Patented Jan. 21, 1947

2,414,436

UNITED STATES PATENT OFFICE 2,414,436

TEMPERATURE COMPENSATING CONDENSER FOR ELECTRICAL CIRCUITS

Russell A. Berg, Fort Monmouth, N. J.

Application March 25, 1943, Serial No. 480,596

4 Claims. (Cl. 175—41.5)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to oscillation generators, and more particularly to means to compensate for changes in the values of circuit elements due to changes in temperature.

The values of variable electrical circuit elements for given settings are often slightly changed by changes in temperature. In some devices particularly oscillators, these changes in the values of circuit elements are serious limitations on the devices. Attempts have been made to compensate for these such changes by including in the circuit a fixed compensating reactance which provides perfect compensation at one setting of the variable reactance. However, this method has the limitation of not providing perfect compensation at other settings of the variable reactance.

It is, therefore, an object of this invention to provide a condenser having means to automatically compensate for changes in the values of circuit elements due to temperature changes at various settings.

A further object is the provision of a condenser having a stator formed from a plurality of thermostatic strips having different temperature coefficients and so arranged that at each setting of the variable condenser a specific strip will coact with the rotor to compensate for changes due to temperature changes.

In accordance with the invention, the compensating condenser is perfectly ganged and in parallel with the tuning condenser of the circuit being tuned.

The above and other objects are attained by the novel arrangement and combination of parts hereinafter described and illustrated in the accompanying drawing, forming a part hereof, and in which:

Figure 1 is a perspective view of a compensating condenser embodying the invention.

Figure 2 is a side view of the condenser.

Figure 3 is front view of plurality of thermostatic strips forming the stator of the condenser.

Figure 4 is a sectional view taken on line 4—4 of Figure 3.

Figure 5 is a perspective view of the rotor.

Figure 6 is a functional diagram of a conventional form of oscillation generator.

Referring to the drawing, the compensating condenser is shown to comprise a casing 1 preferably made of heat insulating material. Rotatably supported by the casing is a shaft 2 provided with a reduced portion 3 to enable it to be connected to other devices.

Fixed to shaft 2 is a rotor 4 in the form of a flat plate provided with an upturned flange 5. Mounted in the casing 1 and spaced from the rotor is a plate 6 which supports a plurality of thermostatic strips 7 having different temperature coefficients, the strips being selected for specific settings of the condenser in order to make the proper correction for each setting. The strips are formed from sheets of two different metals 8 and 9 which have different coefficients of expansion.

The spindle or shaft 3 is connected to the shaft of a tuning condenser of an electrical circuit such as an oscillator circuit so that the tuning condenser and the compensating condenser will move in unison, and for each setting of the tuning condenser there will be a specific setting of the compensating condenser.

Instead of using a number of thermostatic elements as described above, a single thermostatic element with suitable characteristics may be constructed. This may be done, for instance, by varying the thickness of the metals forming the element so that the element has the same temperature characteristics for specific settings as the individual strips.

From the above description it will be seen that there has been provided a simple and effective device for compensating for changes in the values of elements of an electrical circuit due to temperature changes. An oustanding field of usefulness for this device would be in an electrical oscillator circuit. In Figure 6 is shown a wiring diagram of an oscillator circuit, in which a variable tuning condenser 31 is connected in parallel with a thermostatic compensating condenser 32. When there is a change in temperature, the values of the coil 30, condenser 31, and other elements of the circuit will change. Changes of these values cause an appreciable and noticeable change in the frequency of the oscillator. However, the value of the thermostatic compensating condenser 32 will change also with a change in temperature and automatically balance the changes in the values of the elements of the oscillator circuit so that the frequency remains constant.

The compensating condenser and its associated circuits are preferably mounted in a heat insulated chamber so that the temperature of the thermostatic condenser will be the same as that of the other elements of the circuit. The invention having been described, what is claimed is:

1. A device for compensating for changes in the values of elements of an electrical circuit due to temperature changes, comprising a casing, a plate mounted in the casing, a plurality of bimetallic strips arranged in a semicircle, each of said strips having one end thereof attached to the plate and its other end spaced from the plate, said strips being independent of each other and having different temperature coefficients of deflection, a shaft rotatably supported by the casing, and a flat plate having one end thereof fixed to the shaft and its other end provided with an upturned flange positioned adjacent said strips, said flat plate and strips being adapted for connection to an electrical circuit.

2. A device for compensating for changes in the values of elements of an electrical circuit due to temperature changes, comprising a casing, a plate mounted in the casing, a plurality of bimetallic strips, each of said strips having one end thereof attached to the plate and its other end spaced from the plate, said strips being independent of each other and having different temperature coefficients, a shaft rotatably supported by the casing, and a flat plate having one end thereof fixed to the shaft and its other end positioned adjacent said strips, said flat plate and strips adapted for connection to an electrical circuit.

3. In a device for compensating for changes in the values of elements of an electrical circuit due to temperature changes, a plurality of independent bimetallic strips, each of said strips having a fixed end and a free end, the fixed ends of said strips being in substantially the same plane, said strips being independent of each other and having different temperature coefficients of deflection, a rotatably mounted shaft, and a plate having one end fixed to the shaft and its other end positioned adjacent said strips.

4. A device for compensating for changes in the values of elements of an electrical circuit due to temperature changes, comprising a plate, a plurality of bimetallic strips, each of said strips having one end thereof attached to the plate and its other end spaced from the plate, said strips being independent of each other and having different temperature coefficients of deflection, a rotatably mounted shaft, and a flat plate having one end fixed to the shaft and its other end positioned near said strips.

RUSSELL A. BERG.